June 22, 1937.  F. H. STOLP  2,084,658
ACCELERATING TRANSMISSION MECHANISM
Filed June 18, 1935   6 Sheets-Sheet 1

INVENTOR
Frank H. Stolp
BY
his ATTORNEY

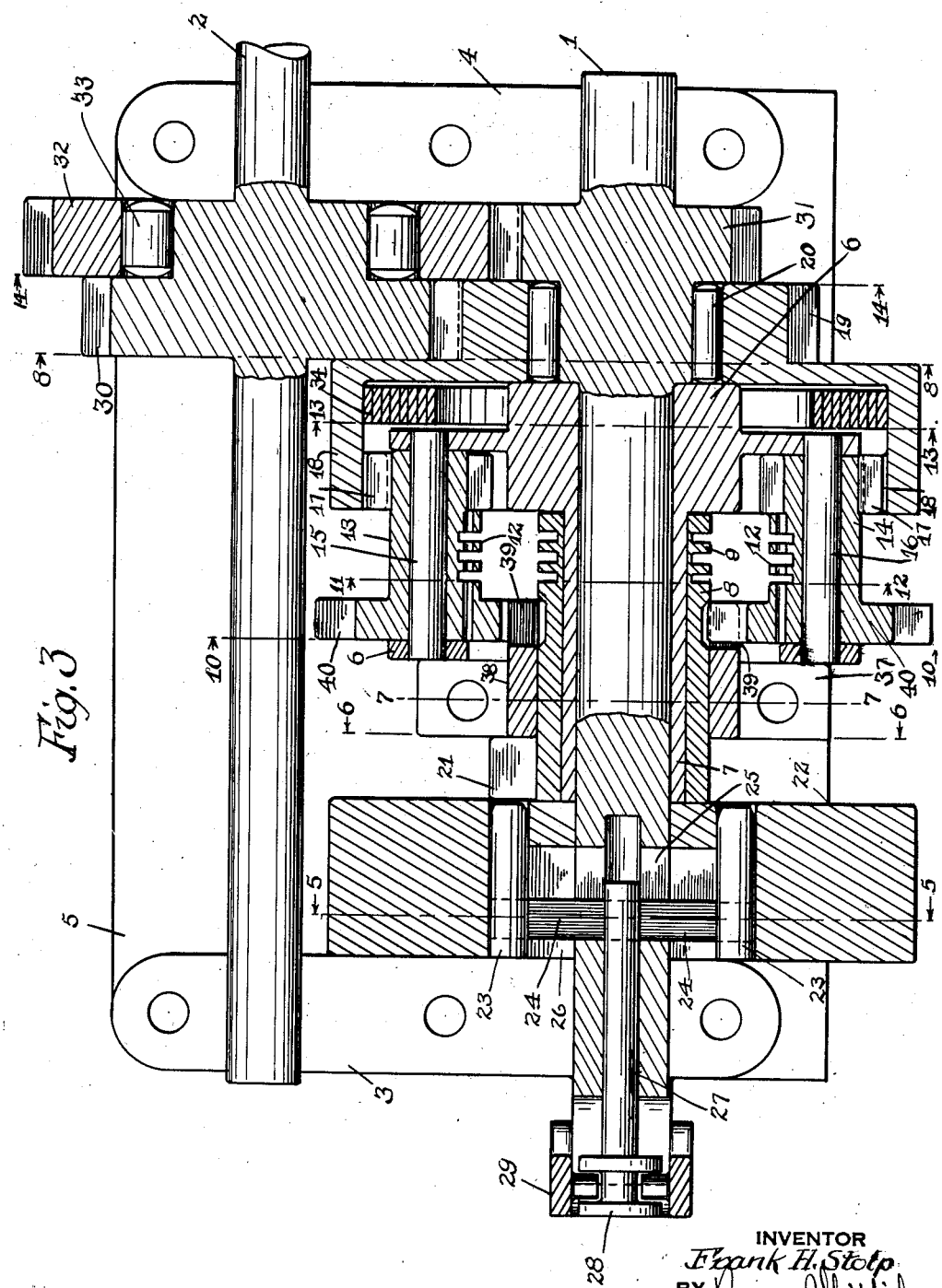

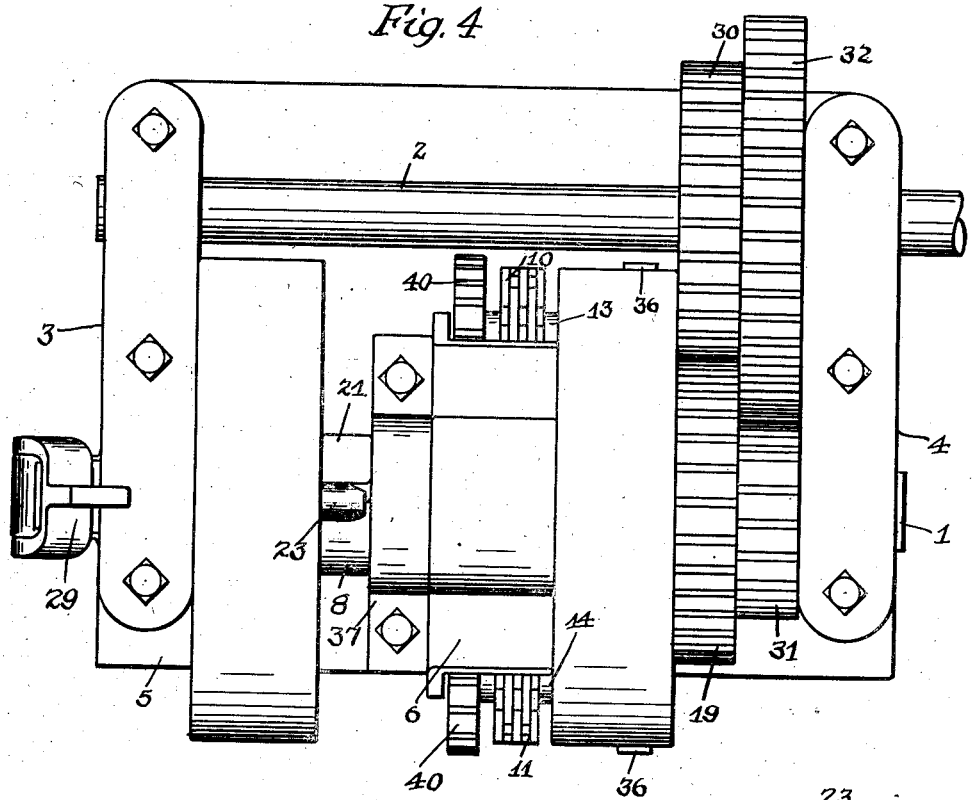
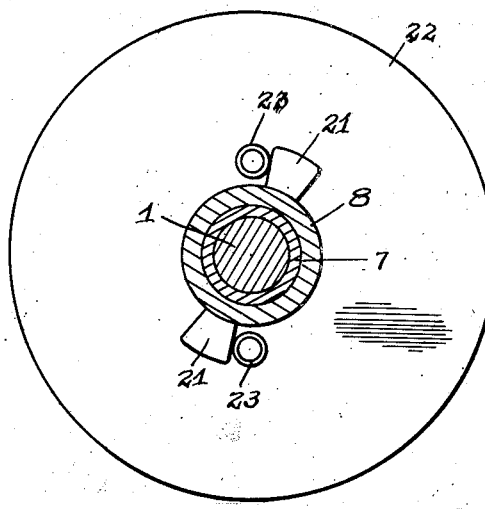
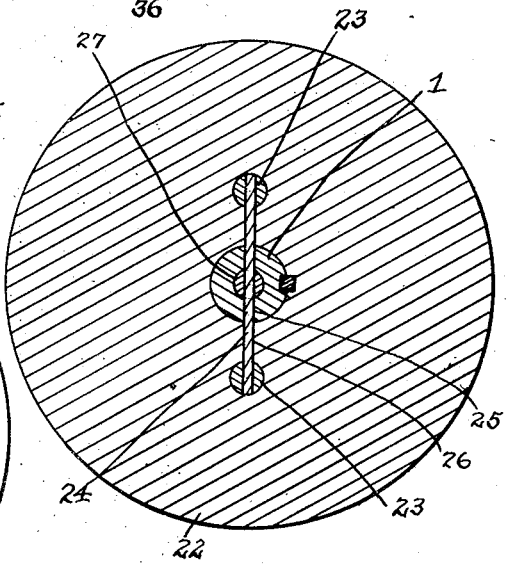

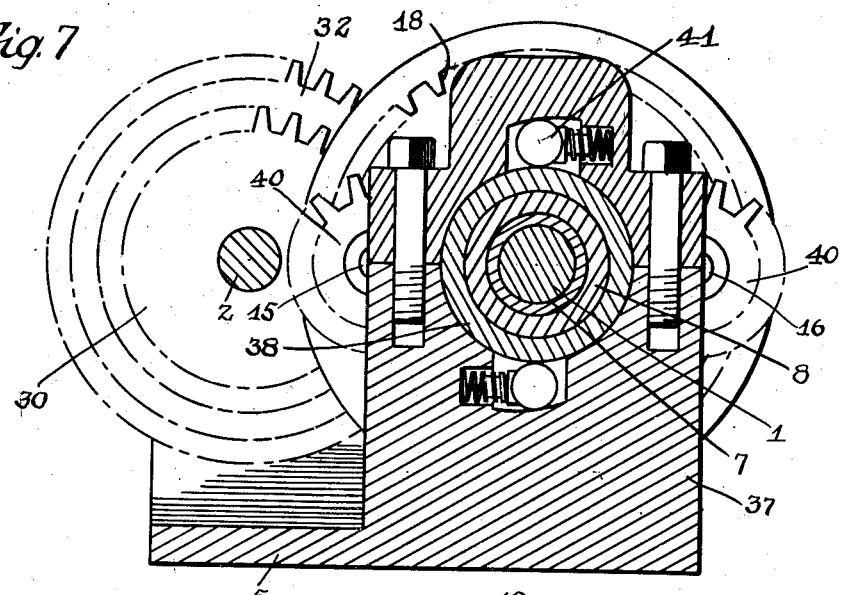
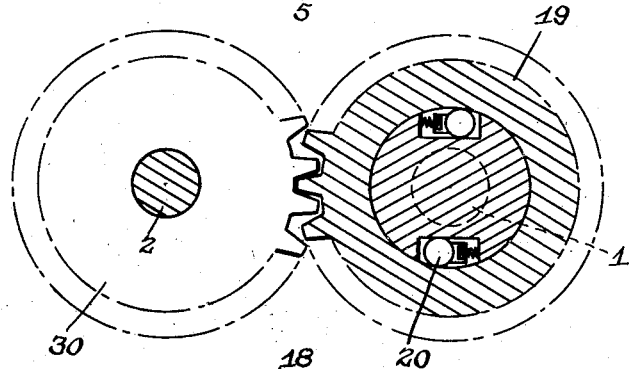
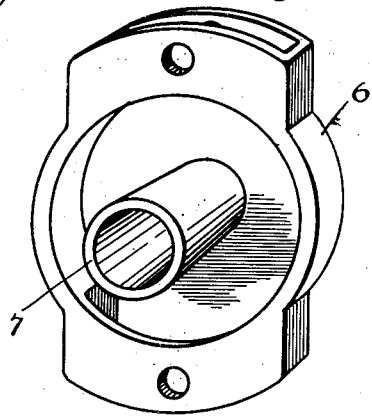
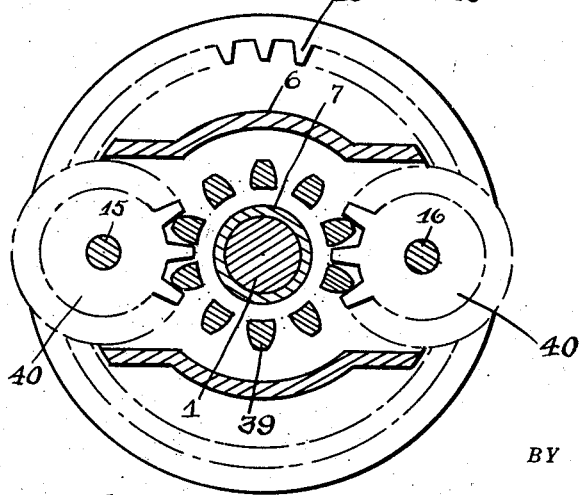

INVENTOR
Frank H. Stolp
BY
his ATTORNEY

June 22, 1937.　　　　F. H. STOLP　　　　2,084,658
ACCELERATING TRANSMISSION MECHANISM
Filed June 18, 1935　　　6 Sheets-Sheet 6

INVENTOR
Frank H. Stolp
BY
his ATTORNEY

Patented June 22, 1937

2,084,658

UNITED STATES PATENT OFFICE 2,084,658

ACCELERATING TRANSMISSION MECHANISM

Frank H. Stolp, Geneva, N. Y.

Application June 18, 1935, Serial No. 27,224

14 Claims. (Cl. 74—280)

My present invention relates to mechanical movements and more particularly to variable speed power transmission mechanisms, and it has for its general object to provide a simple, strong and efficient device of this character that will cause the driven element of a prime mover to slowly pick up speed under load through gearing enabling the prime mover to operate at initially increased mechanical advantage as it takes its load and which gearing gradually accelerates the speed of the driven element as such mechanical advantage decreases until a direct driving connection between the two is established at uniform speed. The invention constitutes an improvement upon or extension of the invention disclosed in my prior patent having the same title, No. 1,888,479, dated November 22, 1932. In the invention of that patent, I utilize a single shaft, on one end of which is a driving element rotatable thereon in one direction only through an overrunning clutch. Also freely rotatable relatively to the shaft in the same direction is a gear carrier, upon which is mounted gearing that turns bodily therewith. Through a main clutch, the driving element locks for rotation with an otherwise loose pinion on the shaft which, through the gearing on the gear carrier and a gear fixed to the shaft, starts the latter slowly relatively to a uniform speed of the driving element, the gearing being of a nature that accelerates this speed until it completes a cycle and then locks all parts together for a direct drive or a speed of rotation the same as that of the driving element. When the main clutch is disengaged or thrown out, the continuous movement of the driving element or its initial movement, if stopped, resets the differential gearing for a succeeding cycle. The present mechanism works on the same general principle, except that I utilize two shafts instead of one, and the improvements are directed in part toward the provision of a low gear drive between the driving and driven elements to initially overcome the starting inertia and relieves the accelerating gearing from first overcoming that load. The improvements are further directed toward the addition of means whereby the acceleration is delayed in point of time, thereby giving a greater range of power distribution during the speed increase. Still further improvements relate to a balancing distribution of weight in the gearing, whereby centrifugal strains are neutralized.

To these and other ends, the invention resides in certain improvements and combinations of parts, all as will be hereinafter more fully described, the novel features being pointed out in the claims at the end of this specification.

In the drawings:

Fig. 3 is an enlarged horizontal section taken in a plane defined by the axes of the driving and driven shafts;

Fig. 4 is a top plan view with the accelerating chains shown set or in normal position so far as they appear;

Fig. 5 is a vertical transverse section taken on the line 5—5 of Fig. 3 through the clutch containing pulley looking in the direction of the arrows;

Fig. 6 is a vertical transverse section taken on the line 6—6 of Fig. 3 through the clutch mechanism taken in the opposite direction, as indicated by the arrows;

Fig. 7 is a vertical transverse section through the center bearing and overrunning clutch on the drive shaft taken on the line 7—7 of Fig. 3;

Fig. 8 is a transverse vertical section through the direct gearing between the drive shaft and the driven shaft taken substantially on the line 8—8 of Fig. 3;

Fig. 9 is a perspective view of the gear carrier of the accelerating mechanism;

Fig 10 is a transverse vertical section through the gear carrier taken substantially on the line 10—10 of Fig. 3, with the accelerating winding chain that would otherwise appear in the background omitted and looking in the direction of the arrows;

Similar reference numerals throughout the several views indicate the same parts.

Figure 16:
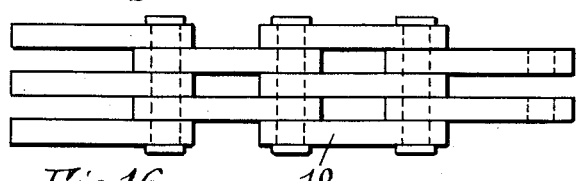
Fig. 16 is an enlarged fragmentary plan of one of the chains.
Figure 17:
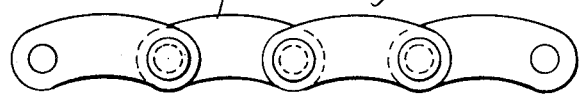
Fig. 17 is a side view thereof.

Referring more particularly to the drawings, 1 indicates a driving shaft and 2 a driven shaft turning in suitable bearings in the end pieces 3 and 4 of a frame or base 5, the present showing having been simplified and made conventional as much as possible with respect to parts not concerned in detail with the novel features of the invention. Mounted to turn freely on the drive shaft is a gear carrying cage or cycle member 6 shown in perspective detail in Fig. 9. It is provided with a long hub 7, upon which turns relatively a winding drum 8 fitted with diametrically oppositely disposed means 9 whereby the inner ends of two multiple link strap chains 10 and 11 are, respectively, attached thereto, said chains being of a nature clearly shown in Figs. 16 and 17 and being of great strength. The outer ends of the chains (Figs. 11 and 12) are similarly attached at 12, respectively, to two diametrically opposite drums 13 and 14, which drums turn on short fixed shafts 15 and 16 supported in the carrying cage 6. Fixed to or integral with each drum is a pinion 17 meshing with the internal gear portion 18 of a main driving gear 19 mounted on driving shaft 1 so that the two turn together or relatively through an overrunning clutch 20 of a familiar type (Fig. 3).

Figure 1:
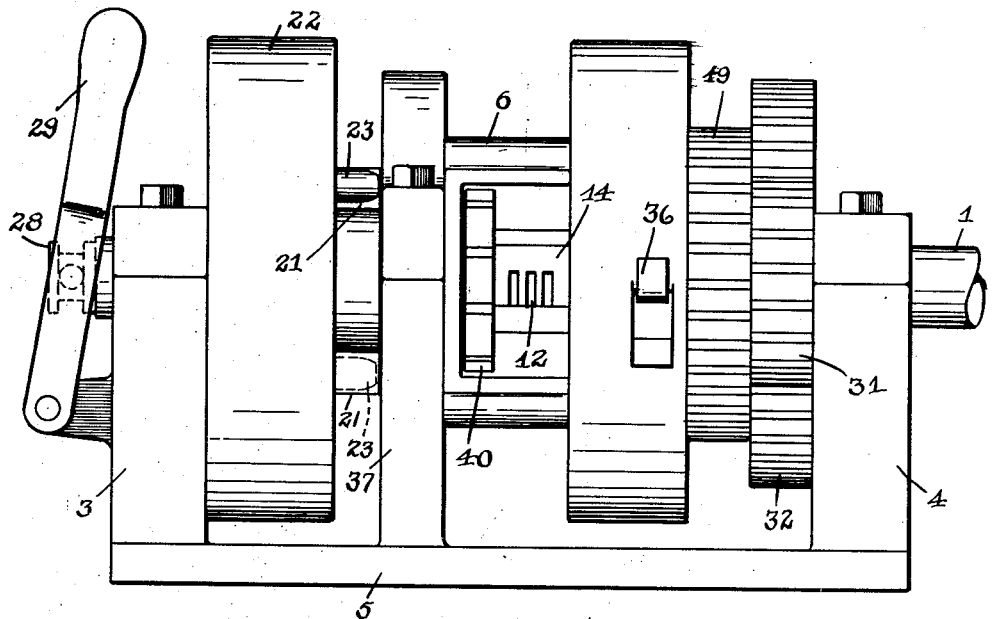
Fig. 1 is a side elevation of a transmission mechanism constructed in accordance with and illustrating one embodiment of my invention, the winding chains of the accelerating gearing being omitted for the sake of clearness.
Figure 2:
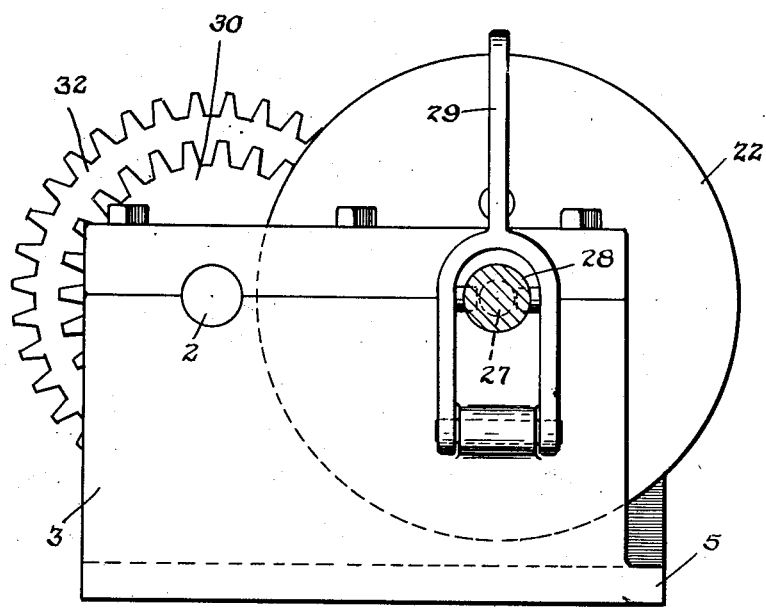
Fig. 2 is an end elevation from the clutch side of the unit, that is, from the left side of Fig. 1.

The winding drum 8 on the cage hub 7 terminates at the opposite end in a shifting clutch element consisting, in the present instance, of a pair of radial lugs 21 that abut a fly wheel and driving pulley 22 splined to the drive shaft, as shown in Fig. 5, and in which slide clutch pins 23 into and out of the path of the lugs 21 to lock therewith or be disengaged therefrom. The pins are connected for joint movement by a rigid head 24 that is flat and slides in slots 25 and 26 in the shaft and the fly wheel pulley, respectively. The head is fixed to a push rod 27 occupying a bore in the shaft and terminating at its other end exteriorly of the frame in a shipping head 28 with which cooperates a shipping lever 29 of the usual type. This main clutch is obviously shown in inoperative position in Fig. 3 and in operative position in Figs. 1, 5 and 6.

Figure 11:
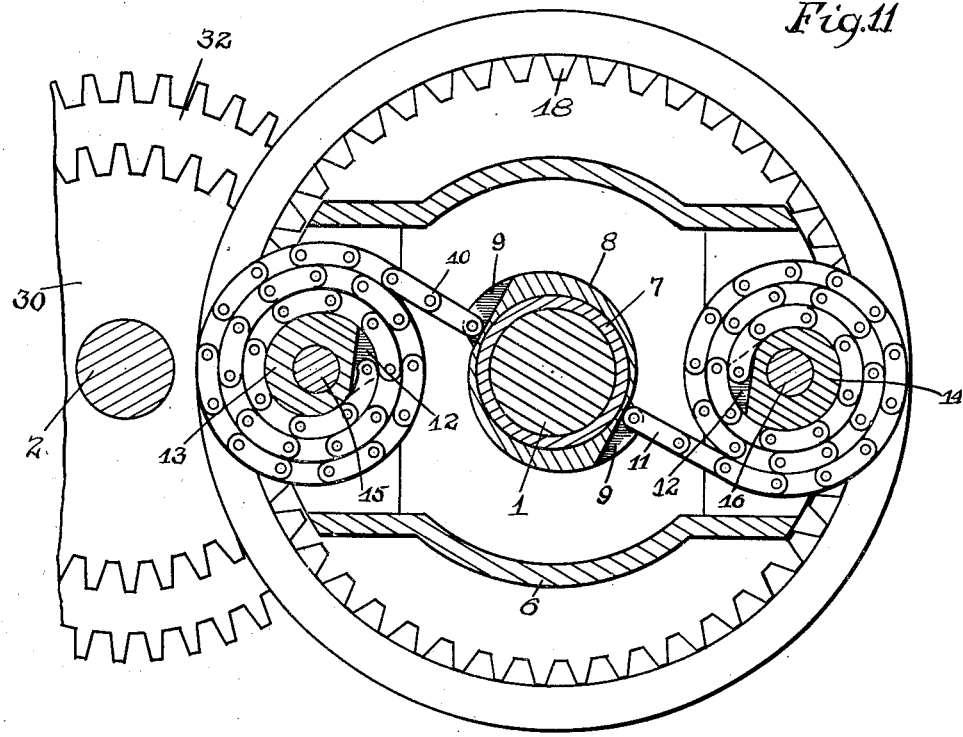
Fig. 11 is a vertical transverse section, partly broken away, taken substantially on the line 11—12 of Fig. 3 through the gear carrier, showing the accelerating chains in initial or wound position.
Figure 12:
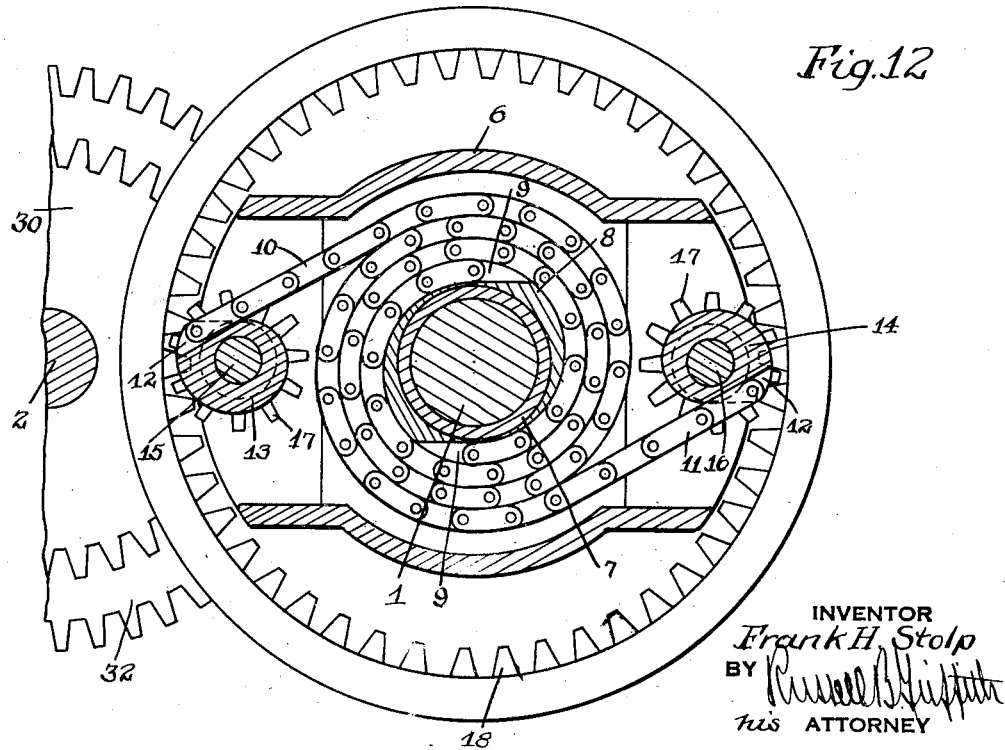
Fig. 12 is a similar view on the same section line 11—12, showing the chains in their high gear position after acceleration.

As so far described, the driving operation is as follows:

The chains 10 and 11 normally stand wound, as in Fig. 11, upon the drums 13 and 14 or perhaps it would be best to refer to these as spools to distinguish from the central winding drum 8. This is when the main clutch 23—21 is out and they are so maintained normally and restored by means that will hereinafter be described. When the main clutch is thrown in, it, of course, locks the pulley or fly wheel and the drive shaft with the main winding drum 8, whereupon the chains 10 and 11 start to wind thereon and unwind from the spools 13 and 14, the convolutions of one building up upon those of the other. Such rotation of the spools causes the pinion 17 thereon to drive the main driving gear 19 through the internally toothed portion 18 thereof. The turning movements of the drive shaft 1, drum 8, spool 13 and driving gear 19 are all in a clockwise direction, as viewed from the main clutch end of the frame. This winding movement continues until the chains pass from the positions of Fig. 11 to those of Fig. 12. From a comparison of these figures, it will be apparent that the rotation of the driving pinions 17 will progressively increase in speed as the convolutions of the chains decrease in diameter on the spools and increase in diameter on the winding drum, so that a gradual acceleration of the speed of the driving gear 19 results. Conversely, the power of the driving shaft and the winding drum 8, in its effect on the spools, decreases but, with the relatively small initial winding diameter, it starts with great mechanical advantage in assuming its load. High speed is reached when the chains are completely wound upon the winding drum 8, whereupon the driving pinions 17 lock with the internal teeth 18 of main driving gear 19 and cause the whole cage 6 to rotate at the same speed as the drive shaft 1, carrying all of the enclosed gearing bodily with it.

It is to be here observed that the cage 6 and the parts carried thereby thus assume the character of a fly wheel. It is to be further observed that the weight of the rotating mass is evenly distributed or balanced because the fixed structure is symmetrical in that regard and the chains pass uniformly from opposite points toward the center. This in itself is an improvement over my prior patent referred to, wherein the coil of the single chain is merely transferred from one eccentric point to another.

Returning to the uniformly gradual driving effect of the drive shaft 1 upon the main driving gear 19 at 18 and the consequent shift from low speed to high, gear 19 meshes with a gear 30 fixed on driven shaft 2 so that the latter is driven in a counter-clockwise direction and, in the present example, at the same speed as the driving shaft, the ratio of the gears 19 and 30 being 1 to 1. If, however, the load on driven shaft 2 should reverse on driving gear 19, it would place adverse strains upon the driving gearing as a whole and, hence, the provision of the overrunning clutch 20.

Figure 14:
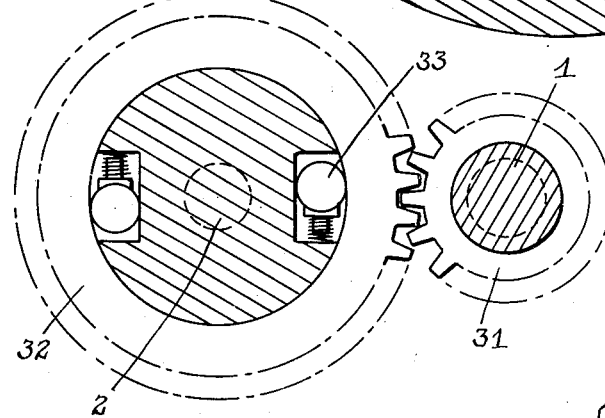
Fig. 14 is a transverse vertical section taken substantially on the line 14—14 of Fig. 3 through the low gearing between the driving and driven shafts.
Figure 15:
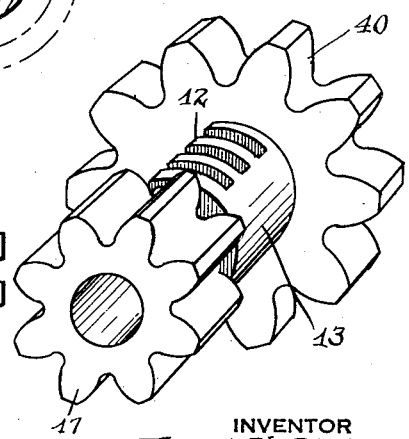
Fig. 15 is a perspective view of one of the chain take-up spools on the gear carrier.

In order that the static load of the driven shaft 2 and its connections may not be initially imposed upon the chain drive of the accelerating mechanism, I provide another set of direct low speed gearing between the drive shaft and the driven shaft. This, in the present instance, consists of a pinion 31 fixed to the drive shaft and meshing with a gear 32 on the driven shaft at all times, the ratio shown being 1 to 2. The gear 32 is connected to the driven shaft by an overrunning clutch 33, as shown in Fig. 14, so that under this direct drive it is locked therewith. However, when the accelerating gearing gets into operation and the drive from main drive gear 19 to gear 30 causes the latter to exceed the speed of driven gear 32, the latter will slip on the driven shaft and become inoperative.

Figure 13:
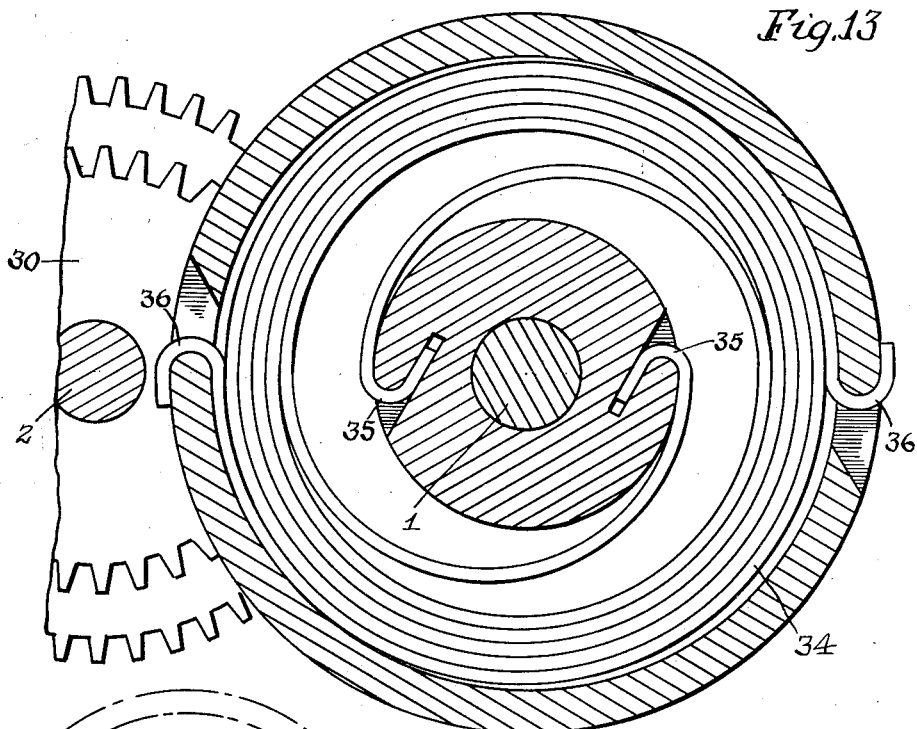
Fig. 13 is a transverse vertical section taken substantially on the line 13—13 of Fig. 3 and looking in the direction of the arrows through the high speed driving gear and showing the rewinding spring for the accelerator chains.

When the main clutch is thrown out and the accelerating driving mechanism comes to rest, the chains 10 and 11 are rewound upon their spools, as in Fig. 11, through a reverse rotation of driving gear 19, which the overrunning clutch 20 permits. This is effected through the medium of a clock spring 34, best shown in Figs. 3 and 13. It is housed within the internal gear portion 18 of main driving gear 19 or, rather, they are, for the spring is preferably formed in two parts wound together, as shown, with their inner ends anchored in notches in a hub on the gear carrying cage 6 at 35 and their outer ends hooked into openings in the gear portion 18 at 36 (see also Fig. 1). As the accelerating gearing goes into action and starts the rotation of the main driving gear through pinion 17, it immediately winds this spring upon the hub and, hence, when the driving force is released, it instantly reverses the main driving gear, causing it, through pinions 17, to rotate the spools 13 in the opposite direction and rewind the chains thereon, the main clutch being out and the central winding drum 8 being hence free to pay off the chains from the coil, shown in Fig. 12.

Of course, all of the gear ratios involved and above described may be changed about and fitted to the intended work, according to whether the particular transmission is designed for light or heavy duty. This applies to the actual spur gearing and also to the winding drum and spool couples of the accelerating device, but I have devised another means of changing the latter ratio with all of the parts so far described remaining unchanged. It will be seen that, in a compact transmission set-up, there are limits beyond which it would be awkward to go in increasing the lengths of the chains 10 and 11 and hence the ratio between the winding drum 8 and the spools 13 and 14. This is done by increasing the time element or factor in the winding of the chains upon the drum to give greater power through a slower rise in the acceleration. The means shown in the present embodiment for accomplishing this is as follows:

There is provided on the frame 5 a central bearing block 37, best shown in Figs. 1, 3, 4 and 7, in which turns a sleeve 38 that furnishes a bearing for winding drum 8 as the latter forms a bearing for the gear carrying hub 7, within which turns the main driving shaft. This sleeve is in the nature of a crown gear having teeth 39 meshing with pinions 40 on the spools 13 and 14. These pinions, together with the driving pinions 17 also offer end flanges for the spools. Their effect is this:

As the spools are rotated during acceleration by the unwinding of the chains therefrom and their winding on the drum 8, the pinions 40, of course, rotate with them and climb around the crown gear 38, which cannot turn reversely because of the overrunning clutch 41, shown in Fig. 7, and hence becomes a fixed part. This results in positively carrying the whole cage 6 rotatably and the spools 13—14, bodily, in the direction of rotation of the drum but at a slower speed, so that the winding is delayed to an extent dependent upon the ratio between crown gear 38 and pinion 40. In other words, the spools that are being unwound are advancing bodily toward the winding medium. It will be recognized that this gives a wide range of possibilities as to the accelerating time factor, besides contributing a gradual imposition of strain upon the driving chains.

An accelerating transmission gear constructed in accordance with my invention may be made exceedingly compact, may be designed with an infinite range of speed and power differential and may be utilized for both light and heavy duty with equal facility and in many different types of machines, the present showing, as aforesaid, having been simplified to the point of conventionality in order to make clear the main principle, construction and mode of operation.

I claim as my invention:

1. In a power transmission mechanism, the combination with a driving element and a driven element, of gearing between the two acting initially to the mechanical advantage of the driving element and having a limited cycle of movement during which it tends to build up the speed of the driven element during a progressive decrease in the mechanical advantage of the driving element, said gearing embodying means for ultimately connecting the driving and driven elements together for direct drive at the conclusion of the cycle, and a separate direct low gear connection between the driving and driven elements having a ratio less than the initial ratio of driving connection between the aforesaid driving element and driven element through the first mentioned gearing.

2. In a power transmission mechanism, the combination with a driving element and a driven element, of gearing between the two acting initially to the mechanical advantage of the driving element and having a limited cycle of movement during which it tends to build up the speed of the driven element during a progressive decrease in the mechanical advantage of the driving element, said gearing embodying means for ultimately connecting the driving and driven elements together for direct drive at the conclusion of the cycle, and a separate direct low gear connection between the driving and driven elements having a ratio less than the initial ratio of driving connection between the aforesaid driving element and driven element through the first mentioned gearing, said low gear connection embodying an overrunning clutch through which the driven element may run ahead of the driving element with respect to such low gear connection when the driven element is otherwise driven.

3. In a power transmission mechanism, the combination with a shaft having a winding drum thereon and a transmission element rotatable about the shaft, of a gear carrier rotatable about the shaft, a pair of spools mounted diametrically oppositely on the gear carrier and geared to turn the transmission element, and two flexible connecters between the respective spools and the drum adapted to be wound from the former upon the latter and rewound on the spools again.

4. In a power transmission mechanism, the combination with a shaft having a winding drum thereon and a transmission element rotatable about the shaft, of a gear carrier rotatable about the shaft, a pair of spools mounted diametrically oppositely on the gear carrier and geared to turn the transmission element, and two flexible connecters between the respective spools and the drum adapted to be wound from the former upon the latter and rewound on the spools again, the connecters being wound on the drum in a single coil of which they respectively form alternate convolutions.

5. In a power transmission mechanism, the combination with a shaft having a winding drum thereon and a transmission element rotatable about the shaft, of a gear carrier rotatable about the latter, a spool mounted on the gear carrier and geared to turn the transmission element, a flexible connecter between the spool and the drum adapted to be wound from the former to the latter and rewound upon the spool again, and a clutch for connecting and disconnecting the shaft and drum.

6. In a power transmission mechanism, the combination with a shaft having a winding drum thereon and a transmission element rotatable about the shaft, of a gear carrier rotatable about the latter, a spool mounted on the gear carrier and geared to turn the transmission element, a flexible connecter between the spool and the drum adapted to be wound from the former to the latter and rewound upon the spool again, an overrunning clutch connection between the transmission element and the shaft, and a spring for restoring the transmission element and rewinding the connecter on the spool.

7. In a power transmission mechanism, the combination with a shaft having a winding drum thereon and a transmission element rotatable about the shaft, of a gear carrier rotatable about the latter, a spool mounted on the gear carrier and geared to turn the transmission element, a flexible connecter between the spool and the drum adapted to be wound from the former to the latter and rewound upon the spool again, an overrunning clutch connection between the transmission element and the shaft, and a clock spring encircling the shaft and housed within the transmission element for restoring the latter and rewinding the connecter on the spool.

8. In a power transmission mechanism, the combination with a shaft having a transmission element rotatable thereon, of a gear carrier also rotatable on the shaft and provided with a hub, a winding drum rotatably mounted on the hub, a spool mounted on the gear carrier and geared to turn the transmission element, a flexible connecter fastened to the spool and to the drum, and a shiftable clutch connecting the shaft and drum.

9. In a power transmission mechanism, the combination with a shaft having a transmission element rotatable thereon, of a gear carrier also rotatable on the shaft, a winding drum rotatable about the shaft, a spool mounted on the gear carrier and geared to turn the transmission element, a flexible connecter fastened to the spool and to the drum adapted to be wound from the former to the latter and rewound, a shiftable clutch connecting the shaft and drum, a spring housed between the transmission element and gear carrier for reversing the former to rewind the connecter on the spool, and an overrunning clutch acting between the transmission element and the shaft.

10. In a power transmission mechanism, the combination with a shaft having a winding drum thereon and a transmission element rotatable about the shaft, of a gear carrier rotatable about the latter, a spool mounted on the gear carrier for planetary motion about the shaft and geared to turn the transmission element, a flexible connecter between the spool and the drum adapted to be wound from the former to the latter and rewound upon the spool again in superposed convolutions, and means on the spool reacting against a relatively fixed part for positively rotating the gear carrier and moving the spool bodily in the direction of winding movement of the drum.

11. In a power transmission mechanism, the combination with a shaft having a winding drum thereon and a transmission element rotatable about the shaft, of a gear carrier rotatable about the latter, a spool mounted on the gear carrier and geared to turn the transmission element, a flexible connecter between the spool and the drum adapted to be wound from the former to the latter and rewound upon the spool again, a gear rotatable about the shaft in the direction of winding of the drum and provided with an overrunning clutch preventing its reverse movement, and a gear on the spool meshing with said last mentioned gear for positively rotating the gear carrier and moving the spool bodily in the direction of winding movement of the drum.

12. In a power transmission mechanism, the combination with a shaft having a relatively rotatable winding drum thereon and a transmission element rotatable on the shaft on an overrunning clutch and embodying an internal gear portion, of a gear carrier rotatable about the shaft, a spool mounted on the gear carrier and provided with a pinion meshing with the internal gear to turn the transmission element, a flexible connecter between the spool and the drum adapted to be wound from the former to the latter and rewound upon the spool again, means on the spool reacting against a relatively fixed part for positively rotating the gear carrier and moving the spool bodily in the direction of winding movement of the drum, a spring encircling the shaft for reversing the gear carrier, and a shiftable clutch connecting the driving shaft and drum.

13. In a power transmission mechanism, the combination with two shafts geared to each other in two different ratios, the lower of which gearings is equipped with an overrunning clutch, of means for rendering effective the higher ratio gearing after a definite number of turns of the shafts.

14. In a power transmission mechanism, the combination with a driving shaft, and a driven shaft and high and low ratio gearing separately connecting them, the high ratio gearing having a progressive accelerating effect upon the driven shaft within a range that includes the ratio of the low ratio gearing, of means for rendering effective the higher ratio gearing after a predetermined number of turns of the shafts, and means for throwing out the low ratio gearing, automatically, when the high ratio gearing exceeds that ratio.

FRANK H. STOLP.